(12) United States Patent
Tokita et al.

(10) Patent No.: US 11,421,093 B2
(45) Date of Patent: Aug. 23, 2022

(54) TWO-STAGE CURABLE LAMINATE

(71) Applicants: MITSUBISHI GAS CHEMICAL COMPANY, INC., Tokyo (JP); MGC FILSHEET CO., LTD., Saitama (JP)

(72) Inventors: Atsuhiro Tokita, Osaka (JP); Shigeki Tahara, Osaka (JP); Masato Takasaki, Osaka (JP); Kishin Ozawa, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 729 days.

(21) Appl. No.: 16/325,466

(22) PCT Filed: Aug. 17, 2017

(86) PCT No.: PCT/JP2017/029485
§ 371 (c)(1),
(2) Date: Feb. 14, 2019

(87) PCT Pub. No.: WO2018/034315
PCT Pub. Date: Feb. 22, 2018

(65) Prior Publication Data
US 2019/0194410 A1 Jun. 27, 2019

(30) Foreign Application Priority Data
Aug. 18, 2016 (JP) .............................. JP2016-160361

(51) Int. Cl.
*C08J 7/04* (2020.01)
*B32B 27/08* (2006.01)
*B32B 27/36* (2006.01)
*B32B 27/30* (2006.01)
*C08J 5/18* (2006.01)
*C08J 7/046* (2020.01)
*B32B 38/18* (2006.01)
*B32B 27/18* (2006.01)
*B32B 7/12* (2006.01)
*B32B 27/16* (2006.01)
*B32B 27/32* (2006.01)
*B32B 27/20* (2006.01)

(52) U.S. Cl.
CPC ............... *C08J 7/046* (2020.01); *B32B 7/12* (2013.01); *B32B 27/08* (2013.01); *B32B 27/16* (2013.01); *B32B 27/18* (2013.01); *B32B 27/20* (2013.01); *B32B 27/302* (2013.01); *B32B 27/308* (2013.01); *B32B 27/32* (2013.01); *B32B 27/36* (2013.01); *B32B 27/365* (2013.01); *B32B 38/18* (2013.01); *C08J 5/18* (2013.01); *C08J 7/0427* (2020.01); *B32B 2250/02* (2013.01); *B32B 2250/24* (2013.01); *B32B 2255/10* (2013.01); *B32B 2255/26* (2013.01); *B32B 2270/00* (2013.01); *B32B 2307/412* (2013.01); *B32B 2307/51* (2013.01); *B32B 2307/536* (2013.01); *B32B 2307/584* (2013.01); *B32B 2307/732* (2013.01); *B32B 2307/738* (2013.01); *B32B 2457/20* (2013.01); *B32B 2457/208* (2013.01); *B32B 2605/003* (2013.01); *B32B 2605/08* (2013.01); *C08J 2333/10* (2013.01); *C08J 2369/00* (2013.01); *C08J 2475/14* (2013.01)

(58) Field of Classification Search
None
See application file for complete search history.

(56) References Cited

U.S. PATENT DOCUMENTS

| | | | |
|---|---|---|---|
| 4,668,588 A | 5/1987 | Kishima | |
| 2009/0252935 A1 | 10/2009 | Koyama et al. | |
| 2009/0274902 A1* | 11/2009 | Kume | G02B 1/18 428/336 |
| 2013/0059158 A1 | 3/2013 | Oguro et al. | |
| 2013/0279001 A1* | 10/2013 | Mochizuki | G02B 1/105 359/361 |
| 2016/0370507 A1* | 12/2016 | Hisamitsu | G02B 1/14 |
| 2017/0136748 A1 | 5/2017 | Onishi et al. | |

FOREIGN PATENT DOCUMENTS

| | | |
|---|---|---|
| JP | 60-193651 | 10/1985 |
| JP | 04-040183 | 2/1992 |
| JP | 06-270350 | 9/1994 |
| JP | 2001-334609 | 12/2001 |
| JP | 2009-196125 | 9/2009 |
| JP | 2009-196153 | 9/2009 |
| JP | 2009-234184 | 10/2009 |
| JP | 2010-284910 | 12/2010 |
| JP | 2015-128899 | 7/2015 |
| WO | 2009/104399 | 8/2009 |
| WO | 2011/145630 | 11/2011 |
| WO | 2015/079867 | 6/2015 |
| WO | WO 2014/104334 | * 7/2017 |

OTHER PUBLICATIONS

English translation of Watanabe WO 2014/104334 (Year: 2014).*
Official Communication issued in International Application No. PCT/JP2017/029485, dated Nov. 14, 2017, and English translation thereof.

* cited by examiner

*Primary Examiner* — Ronak C Patel
(74) *Attorney, Agent, or Firm* — Greenblum & Bernstein, P.L.C..

(57) ABSTRACT

Provided is a two-stage curable laminate characterized in that a layer containing a high-hardness resin (B) is disposed on at least one surface of a resin layer (A) containing a polycarbonate resin (a1), a coating layer (Z) is disposed on the layer containing the high-hardness resin (B), and conditions (i) to (iii) above are satisfied.

12 Claims, No Drawings

TWO-STAGE CURABLE LAMINATE

TECHNICAL FIELD

The present invention relates to a novel thermoforming hard coat sheet (two-stage curable laminate) that is favorable as a component for a display of a mobile phone terminal, a personal computer, a tablet computer, an automobile navigation or the like, as an automobile exterior or interior member that is thermoformable to be adapted for a curved-surface design, and as a housing of a mobile phone terminal, a personal computer, a tablet computer, an automobile navigation or the like.

BACKGROUND ART

While a glass plate, a transparent resin plate or the like is used for automobile interior accessories such as a cover for an instrument panel and a component for a display of a household electric appliance, an office automation equipment, a personal computer, a small portable device or the like, a formed resin article is used for the frame parts for holding the same. Such a formed resin article is integrated with a decorative sheet suitably having a metallic, woodgrain design or the like to be used as a decorated formed article.

A method for integrating a formed article with a sheet provided with a specific function such as a decorative sheet may be (1) a method in which a sheet having a specific function such as a hard coat layer is placed on an injection mold without particular preforming such that the sheet is stuck onto a formed article simultaneously upon forming the injection formed article by injection of a molten resin; or (2) a method in which a decorative sheet that allows thermoforming (vacuum forming, pressure forming, vacuum/pressure forming, etc.) is preformed into a specific shape, which is set into an injection mold, and a molten resin is injected into the injection mold to form an injection formed article such that the preformed decorative sheet is integrated therewith at the same time. Alternatively, (3) a method of coating a surface of a formed article (three dimension overlay method) has also been proposed.

As a decorative sheet, a sheet (for example, an acrylic-based sheet) appropriately having a designed layer such as a print layer and further a film stuck onto the back surface thereof may be used.

For example, Patent document 1 discloses a decorative sheet sequentially laminated, from the surface side, with a transparent acrylic-based resin sheet layer, a pattern printed ink layer, an ABS resin sheet layer and an ABS resin backer layer. Patent document 2 discloses a decorative sheet obtained by providing decoration on one side of a multilayer film that has a layer consisting of a methacrylic resin and acrylic rubber particles laminated on a surface of a polycarbonate resin layer, where the decorated surface is laminated with a thermoplastic resin sheet, and discloses a decorated formed article obtained by injection molding a thermoplastic resin onto said decorated surface.

Patent document 3 discloses an injection molded article using a sheet provided with a thermosetting or ultraviolet-curable hard coat layer instead of the above-described decorative sheet.

Patent document 4 discloses a hard coat sheet or a decorative sheet that has a layer formed with a hard coating material having a specific composition on one side of a substrate sheet or film, which allows thermoforming to some degree and which is appropriately provided with a design on the back surface.

Such a decorative sheet or hard coat sheet is integrated with an injection formed article on the protective layer side (thermoplastic resin sheet side) so as to give a decorated or hard coated formed article.

In such a decorated formed article, a transparent resin sheet is deposited on the surface so that the designed layer is visible through the transparent resin sheet.

Meanwhile, a transparent sheet, especially a glass plate, attached onto frame parts made from an injection molded resin with a double-sided adhesive tape or the like is used as a component of a touchscreen display employed for a mobile phone terminal.

In regard to this, the touchscreen surface preferably has a thinner plate thickness in terms of response speed and the like, but a certain level of thickness is required in terms of strength and thus a highly elastic material is chosen. Moreover, scratch resistance, easiness to wipe off fingerprints and the like are also requisite.

In addition, Patent document 5 discloses a laminate sheet that has a coating layer composed mainly of an acrylic-based resin on one side of a substrate layer composed mainly of a polycarbonate-based resin composition. It is, however, irrelevant to the problem caused upon bending a transparent resin plate having a hard coat layer with high surface hardness on its surface since it does not have a hard coat layer.

PRIOR ART DOCUMENTS

Patent Documents

Patent document 1: Japanese Unexamined Patent Application Publication No. 2001-334609
Patent document 2: Japanese Unexamined Patent Application Publication No. 2009-234184
Patent document 3: Japanese Examined Patent Application Publication No. H4-40183
Patent document 4: Japanese Unexamined Patent Application Publication No. 2010-284910
Patent document 5: Japanese Unexamined Patent Application Publication No. 2009-196153

SUMMARY OF THE INVENTION

Problems to be Solved by the Invention

The present invention has an objective of providing a hard coat sheet or film (two-stage curable laminate) which hardly generates cracks upon thermoforming and thus allows easy thermoforming.

Means for Solving the Problems

The above-described problem can be solved by the present invention below. Thus, the present invention is as follows.

<1> A two-stage curable laminate comprising a layer containing a high-hardness resin (B) on at least one surface of a resin layer (A) containing a polycarbonate resin (a1), the two-stage curable laminate further comprising a coating layer (Z) on the layer containing the high-hardness resin (B), and satisfying the following conditions (i) to (iii):
(i) the thickness of the layer containing the high-hardness resin (B) is 10-250 µm, while the total thickness of the resin layer (A) containing the polycarbonate resin (a1) and the layer containing the high-hardness resin (B) is 100-3,000 μm;

(ii) the high-hardness resin (B) comprises at least one of resins (B1) to (B5) below resin (B1)

a copolymer resin comprising a (meth)acrylic ester constituent unit (a) represented by Formula (1) below and an aliphatic vinyl constituent unit (b) represented by Formula (2) below, wherein a total ratio of the (meth)acrylic ester constituent unit (a) and the aliphatic vinyl constituent unit (b) is 90-100 mol % to the entire constituent units of the copolymer resin, and a ratio of the (meth)acrylic ester constituent unit (a) is 65-80 mol % to the entire constituent units of the copolymer resin

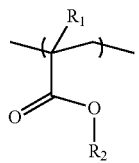

(1)

wherein $R_1$ is a hydrogen atom or a methyl group, and $R_2$ is a C1-C18 alkyl group,

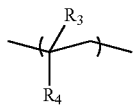

(2)

wherein $R_3$ is a hydrogen atom or a methyl group, $R_4$ is a cyclohexyl group optionally having a C1-C4 hydrocarbon group, resin (B2)

a resin copolymer (D) comprising 6-77 mass % of a (meth)acrylic ester constituent unit, 15-71 mass % of a styrene constituent unit and 8-23 mass % of an unsaturated dicarboxylic acid constituent unit, or an alloy resin of the resin copolymers (D), resin (B3)

a resin comprising 95-45 mass % of a polycarbonate resin (E) and 5-55 mass % of a (meth)acrylate copolymer (F), wherein the (meth)acrylate copolymer (F) contains an aromatic (meth)acrylate unit (f1) and a methacrylic ester monomer unit (f2) at a mass ratio (f1/f2) of 10-50/40-90, the weight-average molecular weight of the polycarbonate resin (E) is 37,000-71,000, and the weight-average molecular weight of the (meth)acrylate copolymer (F) is 5,000-30,000, resin (B4)

a (meth)acrylic ester resin in which a ratio of a constituent unit represented by Formula (1) below to the entire constituent units is 91 mass % or more

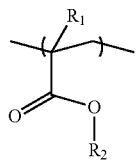

(1)

wherein $R_1$ is a hydrogen atom or a methyl group, and $R_2$ is a C1-C18 alkyl group, and resin (B5)

a resin copolymer (G) containing 5-20 mass % of a styrene constituent unit, 70-90 mass % of a (meth)acrylic ester constituent unit and 5-20 mass % of a N-substituted maleimide monomer, or an alloy resin of the resin copolymer (G) and the resin copolymer (D); and (iii) the coating layer (Z) comprises 2-98 mass % of a (meth)acrylic-based monomer, 2-98 mass % of a (meth)acrylic-based oligomer and 0-15 mass % of a surface modifier, and further comprises 0.001-2.5 parts by mass of a photopolymerization initiator and 0.001-5 parts by mass of a thermal polymerization initiator with respect to 100 parts by mass of the sum of the (meth)acrylic-based monomer, the (meth)acrylic-based oligomer and the surface modifier, wherein the ten-hour half-life temperature of the thermal polymerization initiator is 80° C.-130° C.

<2> The two-stage curable laminate according to <1> above, wherein the coating layer (Z) is photopolymerized.

<3> The two-stage curable laminate according to <2> above, which is further thermally polymerized.

<4> The two-stage curable laminate according to <2> above, wherein the pencil hardness of the coating layer (Z) after the photopolymerization is F to 2H.

<5> The two-stage curable laminate according to any one of <1> to <4> above, wherein the film thickness of the coating layer (Z) is 1 μm to 40 μm.

<6> The two-stage curable laminate according to <3> above, wherein the pencil hardness of the coating layer (Z) after the thermal polymerization is 3H or higher.

<7> The two-stage curable laminate according to <3> above, wherein the coating layer (Z) is thermally polymerized and heat bent at the same time.

<8> A touchscreen protective front panel comprising the two-stage curable laminate according to any one of <1> to <7> above.

<9> A front panel for an office automation equipment or a portable electronic device, comprising the two-stage curable laminate according to any one of <1> to <7> above.

<10> A back panel for an office automation equipment or a portable electronic device, comprising the two-stage curable laminate according to any one of <1> to <7> above.

<11> An automobile part using the two-stage curable laminate according to any one of <1> to <7> above.

<12> An automobile interior member using the two-stage curable laminate according to any one of <1> to <7> above.

According to the present invention, a hard coat sheet (two-stage curable laminate) that is harder than conventional thermoforming hard coat sheets can be produced. In addition, the present invention also provides a hard coat sheet or film that allows a pattern such as a mat pattern transferred on the surface thereof to be hardly worn off by heat. The present invention further provides a hard coat sheet or film whose apparent rainbow effect defect caused by application of a hard coat is reduced.

The sheet or film of the present invention can be used as a component for a display of a personal computers, a mobile phone, an automobile navigation or the like, as an automobile exterior or interior member, and as a housing having a curved-surface design such a mobile phone terminal, a personal computer, a tablet computer, an automobile navigation or the like.

A component for a display may be a transparent plate such as a glass plate, which may be replaced with a transparent resin plate such as an aromatic polycarbonate sheet that has hard coat layers on both sides.

The hard coat layer of the transparent resin plate needs to have scratch resistance and easiness to wipe off fingerprints that are comparative to a glass plate as much as possible. Therefore, in a case of a transparent resin plate that has a hard coat layer with high surface hardness on its surface, it is not used for use with a bent part because cracks are usually caused in the hard coat layer upon bending.

A transparent resin plate that has a hard coat layer with high surface hardness on its surface has higher shock resistance than a usual glass plate, is easier to bend than a usual glass plate and does not break with a slight bending. This seems to owe to a certain, although limited, level of the flexibility of the hard coat layer.

Furthermore, in order to enhance the surface hardness, it is effective if a high-hardness resin such as an acrylic resin is layered on a hard coat side of a polycarbonate resin plate. This is because buckling is caused if the same hard coat is applied to a polycarbonate monolayer substrate which has a low elastic modulus.

Moreover, the present invention employs a hard coat mainly composed of an acrylic component whose refractive index is about 1.51. When this is applied to a polycarbonate resin monolayer sheet or film, the intensity of the reflected light at the interface between the hard coat and the polycarbonate resin becomes high and causes rainbow effect defect due to a large refractive index difference from the polycarbonate resin. According to the present invention, however, a high-hardness resin layer that has a refractive index closer to that of the hard coat is laminated, and thus the intensity of the reflected light at the interface between the hard coat and the high-hardness resin layer can be reduced, thereby suppressing rainbow phenomenon.

When laminating the high-hardness resin that is effective in suppressing rainbow phenomenon and enhancing hardness, attention should be paid to the differences in the glass transition point (Tg) and melt viscosity among respective resins upon thermoforming a multilayer plate made from different types of resins. In a case of the present invention, the plate is thermoformed into a desired shape usually at the forming temperature of the polycarbonate resin that has higher heat resistance. Since the polycarbonate resin has higher Tg and melt viscosity than those of the laminated high-hardness resin, the temperature needs to be high enough to shape the polycarbonate. Since, however, this temperature is too high for the high-hardness resin, high-hardness resin is likely to transform into a rubbery or molten state and thus can easily move. In such a state, the hard coat on the high-hardness resin may be pulled by the easily movable high-hardness resin and becomes more crackable. By using a two-stage curable laminate of the present invention, cracks become less likely to occur.

A thermal polymerization initiator that has a ten-hour half-life temperature of 80° C.-130° C. is preferably selected. More preferably, the ten-hour half-life temperature of the thermal polymerization initiator is 90° C.-120° C. At such a temperature, enhancement of storage stability of the two-stage curable laminate and enhancement of hardness of the hard coat upon thermoforming can both be achieved.

According to the present invention, a ten-hour half-life temperature of a thermal polymerization initiator refers to a temperature at which a concentration of an organic peroxide or an azo group of an azo compound becomes half in 10 hours.

If the ten-hour half-life temperature is less than 80° C. and the resin is stored in an environment at 50° C., i.e., in a warehouse in the summertime, more than about half of the thermal polymerization initiator would initiate in about 10 days by exposure to heat, which increases hardness of the hard coat and thus likely to cause cracks during the thermoforming step. Thus, if a thermal polymerization initiator with a ten-hour half-life temperature of less than 80° C. is used, the stock period needs to be shortened, especially in the summertime.

On the other hand, if the ten-hour half-life temperature of the thermal polymerization initiator exceeds 130° C., the heat applied to the two-stage curable laminate upon thermoforming would not be enough and thus the hardness after the forming cannot fully be enhanced.

A sheet or a film including a polycarbonate resin layer can be thermoformed at about 120° C.-190° C. depending on the forming process such as heat press forming, pressure forming or vacuum forming. When forming is carried out at 120° C., a thermal polymerization initiator with a ten-hour half-life temperature of 80° C. can be added so that about 70% of the initiator is initiated and efficiently cures the hard coat layer in about 5 minutes of forming time. Alternatively, when forming is carried out at 190° C., a thermal polymerization initiator with a ten-hour half-life temperature of approximately 130° C. can be selected so that about 80% of the initiator is initiated and efficiently cures the hard coat layer in about 5 minutes of forming time.

In order to obtain a formed article that has a high hardness with no crack and to obtain a resin sheet or film having a less rainbow effect appearance, various studies and tests were conducted relative to resin materials, their layer constitutions, bending conditions and else. As a result, it was found that a formed article with high pencil hardness, less rainbow effect and no crack can be obtained by using a two-stage curable laminate that satisfies specific conditions, thereby accomplishing the present invention.

Advantageous Effect of the Invention

According to the present invention, a formed article with high pencil hardness, with a curved shape and with a less rainbow phenomenon can be produced. Accordingly, for example, a component having a bent part continuous with a flat part can be obtained from a transparent resin sheet, and thus an article having a novel design or function can be provided.

When a conventional hard coat sheet is subjected to thermoforming such as heat press forming, vacuum forming, pressure forming or TOM forming, defects such as cracks in the hard coat sheet are frequently occurred. In order to suppress occurrence of cracks upon thermoforming, the hardness of the hard coat needs to be reduced. While reduction of the hardness of the hard coat enhances thermoforming property, the hard coat may easily be damaged or its chemical resistance may be deteriorated due to its softness and therefore performance of the hard coat had to be lowered.

The present invention is capable of providing a hard coat-applied resin sheet (two-stage curable laminate) that has excellent thermoforming property, high hardness and high chemical resistance.

Many conventional hard coats are added with a photopolymerization initiator. According to the present invention, a thermal polymerization initiator is added in addition to the photopolymerization initiator. Conventional coated sheets including a combination of a photopolymerization initiator and a thermal polymerization initiator are described in Japanese Patent Nos. 369516 and 3944633. These resin sheets or films, however, have a hard coat applied to a monolayer sheet or film made from PET or a polycarbonate resin, and thus lacked hardness of the hard coat surface. The present invention is a laminate sheet or film made from a polycarbonate resin and a high-hardness resin, which is superior to the conventional PET or polycarbonate monolayer.

A hard coat of the present invention added with a photopolymerization initiator and a thermal polymerization initiator is applied to a sheet made from a resin such as polycarbonate by a technique such as gravure coating, dip coating or bar coating, and the resultant is cured by irradiation with UV light. The amount of the photopolymerization initiator is adjusted such that the hard coat does not become too hard upon this UV light irradiation. Since the hard coat of the resulting hard coat sheet is not completely cured and thus is soft, it is well suited for thermoforming. The thus-produced hard coat sheet is subjected to thermoforming. At this point, if the sheet is made from a polycarbonate resin, it is formed into a shape of the mold at a temperature of about 120° C.-190° C. The thermal polymerization initiator contained in the hard coat generates radicals by exposure to heat upon this thermoforming, whereby the (meth)acryloyl group that was uncured upon photopolymerization is further cured.

In such a manner, a formed article that is harder and that has better chemical resistance than conventional products can be produced from a hard coat sheet. Conventional hard coat sheets have defects such as occurrence of cracks upon thermoforming for being too hard, or deterioration of hardness, scratch resistance and chemical resistance for making the hard coat soft to enhance the forming property. The present invention is capable of producing a formed article from a hard coat sheet without such defects.

EMBODIMENTS FOR CARRYING OUT THE INVENTION

Hereinafter, the present invention will be illustrated in detail by way of production examples and examples, although the present invention should not be limited to the illustrated production examples, examples and the like, and can be carried out by altering the method within a scope that does not greatly depart from the scope of the present invention.

A two-stage curable laminate of the present invention comprises a layer containing a high-hardness resin (B) (hereinafter, also referred to as a "high-hardness layer") and a coating layer deposited on at least one surface of a resin layer (A) containing a polycarbonate resin (a1) (hereinafter, also referred to as a "substrate layer"). The substrate layer may be a layer made from a polycarbonate resin (a1). The high-hardness layer may be a layer made from a high-hardness resin (B). The layers are sequentially laminated so that the high-hardness layer is deposited between the substrate layer and the coating layer. While the other side of the resin layer (A) containing the polycarbonate resin (a1) is not particularly specified, it may be provided with either one or both of the high-hardness resin layer and the coating layer. In this case, the high-hardness resin layer is preferably a resin that is selected from the high-hardness resins (B). More preferably, the same high-hardness resin (B) is used on both sides so as to reduce warping.

Hereinafter, each of constituent members of a two-stage curable laminate according to the present invention will be described.

(Resin layer (A) containing polycarbonate resin (a1))

A resin layer (A) containing a polycarbonate resin (a1) according to the present invention refers to a resin layer mainly containing a polycarbonate resin (a1). The content of the polycarbonate resin (a1) contained in the resin layer (A) is 75 mass % or more, preferably 90 mass % or more, and more preferably 100 mass % because a higher content enhances the shock resistance.

While the polycarbonate resin (a1) is not particularly limited as long as it contains a carbonate ester bond, i.e., a —[O—R—OCO]— unit (where R represents linear or branched, aliphatic, aromatic or both aliphatic and aromatic groups), in the main chain of the molecule, a polycarbonate resin particularly containing a structural unit represented by Formula (4a) below is preferably used. By using such a polycarbonate resin, a resin laminate excellent in shock resistance can be obtained.

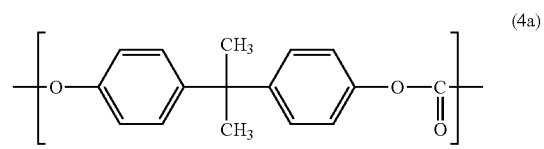

(4a)

Specifically, as the polycarbonate resin (a1), an aromatic polycarbonate resin (for example, from Mitsubishi Engineering-Plastics Corporation, under the trade name of Iupilon S-2000, Iupilon S-1000, Iupilon E-2000) or the like may be used.

Due to the recent increasing demand for curved front panels, the polycarbonate resin (a1) preferably comprises a monohydric phenol represented by Formula (4) below as a terminating agent:

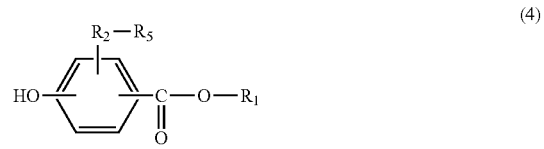

(4)

(wherein, $R_1$ represents a C8-C36 alkyl or C8-C36 alkenyl group, and $R_2$-$R_5$ each independently represent a hydrogen atom, a halogen or an optionally substituted C1-C20 alkyl or C6-C12 aryl group, wherein the substituent is a halogen, a C1-C20 alkyl group or a C6-C12 aryl group).

More preferably, the monohydric phenol represented by Formula (4) is represented by Formula (5) below.

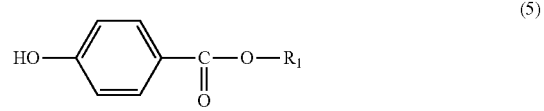

(5)

(wherein, $R_1$ represents a C8-C36 alkyl or C8-C36 alkenyl group).

The number of carbons of $R_1$ in Formula (4) or (5) is preferably within a specific numerical range.

Specifically, the upper limit value of the carbon number of $R_1$ is preferably 36, more preferably 22 and particularly preferably 18. The lower limit value of the carbon number of $R_1$ is preferably 8 and more preferably 12.

Among the monohydric phenols represented by Formulae (4) and (5) (terminating agents), either or both of para-hydroxybenzoic acid hexadecyl ester, and para-hydroxybenzoic acid 2-hexyldecyl ester are particularly preferably used as the terminating agent.

For example, a monohydric phenol (terminating agent) wherein $R_1$ is a C16 alkyl group is excellent in glass transition temperature, melt fluidity, forming property, drawdown resistance and solvent solubility of the monohydric phenol upon producing a polycarbonate resin, and thus is particularly preferably as a terminating agent used in the polycarbonate resin of the present invention.

On the other hand, if the number of carbons of $R_1$ in Formula (4) or (5) is too large, solubility of the monohydric phenol (terminating agent) in an organic solvent is likely to decrease, which may decrease the productivity of the polycarbonate resin.

For example, if the number of carbons of $R_1$ is 36 or less, the productivity of the polycarbonate resin would be high and thus it would be highly economic. If the number of carbons of $R_1$ is less than 22, the monohydric phenol would have particularly excellent solubility in an organic solvent, and the productivity of the polycarbonate resin would be high and thus it would be highly economic.

If the number of carbons of $R_1$ in Formula (4) or (5) is too small, the glass transition temperature of the polycarbonate resin would not be sufficiently low and the thermoforming property may be deteriorated.

According to the present invention, the weight-average molecular weight of the polycarbonate resin (a1) affects the shock resistance and the forming conditions of the two-stage curable laminate. Specifically, if the weight-average molecular weight is too small, the shock resistance of the two-stage curable laminate would be deteriorated, which is unfavorable. If the weight-average molecular weight is too large, an excessive heat source may be required upon laminating the resin layer (A) containing the polycarbonate resin (a1), which is unfavorable. Moreover, since a high temperature may be required depending on the forming process, the polycarbonate resin (a1) may be exposed to a high temperature, which may adversely affect the heat stability. The weight-average molecular weight of the polycarbonate resin (a1) is preferably 15,000-75,000, more preferably 20,000-70,000, and still more preferably 25,000-65,000. Herein, a weight-average molecular weight refers to a weight-average molecular weight determined by gel permeation chromatography (GPC) in terms of polystyrene standards.

(Layer Containing High-Hardness Resin (B))

A high-hardness resin (B) used for the present invention is at least one selected from resins (B1), (B2), (B3), (B4) and (B5).

<Resin (B1)>

The resin (B1) used for the present invention is a copolymer resin comprising a (meth)acrylic ester constituent unit (a) represented by Formula (1) below and an aliphatic vinyl constituent unit (b) represented by Formula (2) below, where a total ratio of the (meth)acrylic ester constituent unit (a) and the aliphatic vinyl constituent unit (b) is 90-100 mol % to the entire constituent units of the copolymer resin, and a ratio of the (meth)acrylic ester constituent unit (a) is 65-80 mol % to the entire constituent units of the copolymer resin.

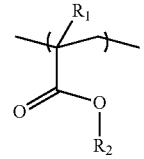

(1)

(wherein, $R_1$ is a hydrogen atom or a methyl group, and $R_2$ is a C1-C18 alkyl group)

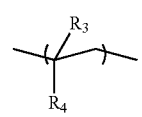

(2)

(wherein, $R_3$ is a hydrogen atom or a methyl group, and $R_4$ is a cyclohexyl group optionally having a C1-C4 hydrocarbon group).

$R_2$ in the (meth)acrylic ester constituent unit (a) represented by Formula (1) above is a C1-C18 alkyl group, specifically a methyl group, an ethyl group, a butyl group, a lauryl group, a stearyl group, a cyclohexyl group, an isobornyl group or the like.

Among the (meth)acrylic ester constituent units (a), a (meth)acrylic ester constituent unit having a methyl group or an ethyl group as $R_2$ is preferable, and a methyl methacrylate constituent unit having a methyl group as R1 and a methyl group as R2 is more preferable.

Examples of the aliphatic vinyl constituent unit (b) represented by Formula (2) above preferably include one that has a hydrogen atom or a methyl group as $R_3$ and a cyclohexyl group or a cyclohexyl group having a C1-C4 hydrocarbon group as $R_4$.

Among the aliphatic vinyl constituent units (b), an aliphatic vinyl constituent unit having a hydrogen atom as $R_3$ and a cyclohexyl group as $R_4$ is more preferable.

The resin (B1) may contain one or more types of the above-described (meth)acrylic ester constituent units (a) and one or more types of the above-described aliphatic vinyl constituent units (b).

The total ratio of the (meth)acrylic ester constituent unit (a) and the aliphatic vinyl constituent unit (b) is 90-100 mol %, preferably 95-100 mol % and more preferably 98-100 mol % to the total of the entire constituent units of the copolymer resin.

Specifically, the resin (B1) may contain a constituent unit other than the (meth)acrylic ester constituent unit (a) and the aliphatic vinyl constituent unit (b), for 10 mol % or less to the total of the entire constituent units of the copolymer resin.

An example of the constituent unit other than the (meth)acrylic ester constituent unit (a) and the aliphatic vinyl constituent unit (b) includes a constituent unit derived from an aromatic vinyl monomer including non-hydrogenated aromatic double bonds, in a resin (B1) obtained by polymerizing a (meth)acrylic ester monomer and an aromatic vinyl monomer and thereafter hydrogenating aromatic double bonds of the aromatic vinyl monomer.

Furthermore, a ratio of the (meth)acrylic ester constituent unit (a) represented by Formula (1) above is 65-80 mol % and preferably 70-80 mol % with respect to the total of the entire constituent units in the resin (B1). If the ratio of the (meth)acrylic ester constituent unit (a) with respect to the total of the entire constituent units in the resin (B1) is less than 65 mol %, adhesion with the resin layer (A) containing the polycarbonate resin (a1) and surface hardness may be deteriorated, which is impractical. On the other hand, if the ratio exceeds 80 mol %, warping may occur due to water absorption by the two-stage curable laminate, which may be impractical.

While a method for producing the resin (B1) is not particularly limited, the resin is preferably obtained by polymerizing at least one type of (meth)acrylic ester monomer and at least one type of aromatic vinyl monomer, and thereafter hydrogenating aromatic double bonds derived from the aromatic vinyl monomer. Herein, (meth)acrylic acid refers to methacrylic acid and/or acrylic acid.

Examples of the aromatic vinyl monomer used for this specifically include styrene, α-methylstyrene, p-hydroxystyrene, alkoxystyrene, chlorostyrene and derivatives thereof. Among them, styrene is preferable.

The (meth)acrylic ester monomer and the aromatic vinyl monomer can be polymerized by a known method such as bulk polymerization, solution polymerization or the like.

Bulk polymerization is carried out by continuously supplying a monomer composition containing the above-mentioned monomers and a polymerization initiator into a completely stirred tank reactor so as to allow continuous polymerization at 100-180° C. If necessary, the above-described monomer composition may contain a chain transfer agent.

Examples of the polymerization initiator includes, but not limited to, organic peroxides such as t-amylperoxy-2-ethylhexanoate, t-butylperoxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylpropoxy isopropyl monocarbonate, t-amylperoxy normal-octoate, t-butylperoxy isopropyl monocarbonate and di-t-butyl peroxide, and azo compounds such as 2,2'-azobis isobutyronitrile, 2,2'-azobis(2-methylbutyronitrile) and 2,2'-azobis(2,4-dimethylvaleronitrile). These may be used alone or two or more of them may be used in combination.

A chain transfer agent may be used as necessary, which may be, for example, an α-methylstyrene dimer.

Examples of a solvent used for the solution polymerization include hydrocarbon-based solvents such as toluene, xylene, cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The solvent used for the hydrogenation reaction after the polymerization of the (meth)acrylic ester monomer and the aromatic vinyl monomer may be the same as or different from the above-described solvent used for the polymerization. Examples include hydrocarbon-based solvents such as cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

After polymerizing the (meth)acrylic ester monomer and the aromatic vinyl monomer as described above, the aromatic double bond derived from the aromatic vinyl monomer can be hydrogenated to obtain a resin (B1) used for the present invention.

The hydrogenation method is not particularly limited, and a known method can be employed. For example, it may be performed in batch or continuous flow mode under a hydrogen pressure of 3-30 MPa at a reaction temperature of 60° C.-250° C. A temperature of 60° C. or higher can lengthy reaction time, and a temperature of 250° C. or lower can suppress occurrence of molecular chain scission and hydrogenation of the ester moiety.

Examples of a catalyst used for the hydrogenation reaction include solid catalysts in which a metal such as nickel, palladium, platinum, cobalt, ruthenium or rhodium, or an oxide, a salt or a complex compounds of such a metal is carried by a porous carrier such as carbon, alumina, silica, silica-alumina or diatomite.

Preferably, the resin (B1) has 70% or more of the aromatic double bonds in the aromatic vinyl monomer hydrogenated. In other words, a ratio of a non-hydrogenated moiety of the aromatic double bonds in a constituent unit derived from the aromatic vinyl monomer is preferably 30% or less. If it exceeds 30%, transparency of the resin (B1) may be deteriorated. The ratio of the non-hydrogenated moiety is more preferably less than 10%, and still more preferably less than 5%.

While the weight-average molecular weight of the resin (B1) is not particularly limited, it is preferably 50,000-400,000 and more preferably 70,000-300,000 in terms of strength and forming property.

The above-described weight-average molecular weight refers to a weight-average molecular weight determined by gel permeation chromatography (GPC) in terms of polystyrene standards.

The resin (B1) may be blended with other resin as long as its transparency is not impaired. Examples include a methyl methacrylate-styrene copolymer resin, polymethyl methacrylate, polystyrene, polycarbonate and cycloolefin (co)polymer resins, an acrylonitrile-styrene copolymer resin, an acrylonitrile-butadiene-styrene copolymer resin, and various elastomers.

The glass transition temperature of the resin (B1) is preferably in a range of 110° C.-140° C. A glass transition temperature of 110° C. or higher can give a two-stage curable laminate provided by the present invention to be less deformable or breakable in a hot environment or in a humid and hot environment, while a temperature of 140° C. can enhance workability upon continuous heat shaping with a mirror-finished roll or a shaping roll, or upon batch-mode heat shaping with a mirror-finished mold or a shaping mold. Herein, the glass transition temperature according to the present invention refers to a temperature that can be calculated by subjecting 10 mg of sample to a midpoint method using a differential scanning calorimeter at a temperature rising rate of 10° C./min.

<Resin (B2)>

A resin (B2) used for the present invention is a resin copolymer (D) comprising 6-77 mass % of the (meth)acrylic ester constituent unit, 15-71 mass % of the styrene constituent unit and 8-23 mass % of the unsaturated dicarboxylic acid constituent unit, or an alloy resin of the resin copolymers (D).

Examples of the (meth)acrylic ester constituent unit include acrylic acid, methyl acrylate, ethyl acrylate, n-butyl acrylate, 2-ethylhexyl acrylate, methacrylic acid, methyl methacrylate, ethyl methacrylate, n-butyl methacrylate and 2-ethylhexyl methacrylate, where methyl methacrylate is particularly preferable as a monomer unit. Alternatively, it may be a copolymer containing two or more types of the above-described monomer units.

While the styrene constituent unit is not particularly limited and any known styrene-based monomer can be used, it is styrene, α-methylstyrene, o-methylstyrene, m-methylstyrene, p-methylstyrene, t-butylstyrene or the like in terms of availability. Among them, styrene is particularly preferable in terms of miscibility. A mixture of two or more types of these styrene-based monomers may also be used.

Examples of the unsaturated dicarboxylic acid constituent unit include acid anhydrides of maleic acid, itaconic acid, citraconic acid, aconitic acid or the like, where maleic anhydride is preferable in terms of miscibility with a vinyl-based monomer. A mixture of two or more types of these unsaturated dicarboxylic anhydride monomers may also be used.

<Resin (B3)>

A resin (B3) used for the present invention is a resin comprising 95-45 mass % of a polycarbonate resin (E) and 5-55 mass % of a (meth)acrylate copolymer (F), where the (meth)acrylate copolymer (F) contains an aromatic (meth)acrylate unit (f1) and a methacrylic ester monomer unit (f2) at a mass ratio (f1/f2) of 10-50/40-90, where the weight-average molecular weight of the polycarbonate resin (E) is 37,000-71,000, and where the weight-average molecular weight of the (meth)acrylate copolymer (F) is 5,000-30,000.

The polycarbonate resin (E) is not particularly limited as long as it contains a carbonate ester bond, i.e., a —[O—R—OCO]— unit (where R represents linear or branched, aliphatic, aromatic or both aliphatic and aromatic groups), in the main chain of the molecule.

The (meth)acrylate copolymer (F) used for the present invention comprises an aromatic (meth)acrylate unit (f1) and a methacrylic ester monomer unit (f2). According to the present invention, (meth)acrylate refers to acrylate or methacrylate.

An aromatic (meth)acrylate constituting the aromatic (meth)acrylate unit (f1) refers to (meth)acrylate having an aromatic group at the ester moiety. Examples of the aromatic (meth)acrylate include phenyl (meth)acrylate and benzyl (meth)acrylate. One or a combination of them may be used. Among them, phenyl methacrylate and benzyl methacrylate are preferable, and phenyl methacrylate is more preferable. The aromatic (meth)acrylate unit (f1) can enhance transparency of a formed article that is mixed with an aromatic polycarbonate resin.

A monomer constituting the methacrylic ester monomer unit (f2) is methyl methacrylate. Since the methacrylic ester monomer unit (f2) has an effect of being well dispersed with the polycarbonate-based resin and transfers to the surface of the formed article, the surface hardness of the formed article can be enhanced.

The (meth)acrylate copolymer (F) contains 10-50 mass % (preferably, 20-40 mass %) of an aromatic (meth)acrylate unit (f1) and 40-90 mass % (preferably, 60-80 mass %) of a methacrylic ester monomer unit (f2) (provided that the sum of (f1) and (f2) is 100 mass %). If the content of the aromatic (meth)acrylate unit (f1) in the (meth)acrylate copolymer (F) is 10 mass % or more, transparency can be maintained in the region having a high content of the (meth)acrylate copolymer (F) while if it is 50 mass % or less, miscibility with the polycarbonate would not be too high so that transfer to the surface of the formed article and thus surface hardness is not lowered.

The weight-average molecular weight of the (meth)acrylate copolymer (F) is 5,000-30,000 and preferably 10,000-25,000. If the weight-average molecular weight is 5,000-30,000, miscibility with the polycarbonate would be good and thus excellent in enhancing the surface hardness.

According to the present invention, the composition ratio of the (meth)acrylate copolymer (F) and the polycarbonate resin (E) is 5-55 mass % for the component (F) while 95-45 mass % for the component (E). Preferably, the component (F) is 20-50 mass % while the component (E) is 80-50 mass %. More preferably, the component (F) is 30-50 mass % while the component (E) is 70-50 mass %. Within this composition ratio, a high-hardness resin (B) that has a surface hardness well balanced with various physical properties such as shock resistance and water absorption can be obtained while maintaining transparency.

According to the present invention, the weight-average molecular weight of the polycarbonate resin (E) is determined by the ease of mixing (dispersion) with the (meth)acrylate copolymer (F). Specifically, if the weight-average molecular weight of the polycarbonate resin (E) is too large, difference in the melt viscosity between the component (E) and the component (F) becomes too large and impairs their mixing (dispersion), which causes defects such as deterioration of transparency or disturbance of continuous stable melt kneading. On the other hand, if the weight-average molecular weight of the polycarbonate resin (E) is too small, strength of the layer containing the high-hardness resin (B) will be reduced, which causes problems such as deterioration of shock resistance of the two-stage curable laminate.

The weight-average molecular weight of the polycarbonate resin (E) is in a range of 37,000-71,000, preferably in a range of 42,000-68,000 and more preferably in a range of 48,000-64,000. Here, the weight-average molecular weight of the polycarbonate resin (E) and the (meth)acrylate copolymer (F) refers to a weight-average molecular weight determined by gel permeation chromatography (GPC) in terms of polystyrene standards.

<Resin (B4)>

A resin (B4) used for the present invention refers to a (meth)acrylic ester resin in which a ratio of a constituent unit represented by Formula (1) below is 91 mass % or more in the entire constituent units. Preferably, it is a (meth)acrylic ester resin in which the ratio of the constituent unit represented by Formula (1) below is 94-100 mass % in the entire constituent units.

(1)

(wherein, $R_1$ is a hydrogen atom or a methyl group, and $R_2$ is a C1-C18 alkyl group, where $R_2$ is preferably a C1-C10 alkyl group).

While a known method can be employed for polymerization of the resin (B4), the resin (B4) may be prepared, for example, by bulk polymerization, solution polymerization or the like.

Bulk polymerization is carried out by continuously supplying a monomer composition containing at least one type of (meth)acrylic ester monomer and a polymerization initiator into a completely stirred tank reactor so as to allow continuous polymerization at 100° C.-180° C. If necessary, the above-described monomer composition may contain a chain transfer agent.

Examples of the polymerization initiator includes, but not limited to, organic peroxides such as t-amylperoxy-2-ethylhexanoate, t-butylperoxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylpropoxy isopropyl monocarbonate, t-amylperoxy normal-octoate, t-butylperoxy isopropyl monocarbonate and di-t-butyl peroxide, and azo compounds such as 2,2'-azobis isobutyronitrile, 2,T-azobis(2-methylbutyronitrile) and 2,2'-azobis(2,4-dimethylvaleronitrile). These may be used alone or two or more of them may be used in combination.

A chain transfer agent may be used as necessary, which may be, for example, an α-methylstyrene dimer.

Examples of a solvent used for the solution polymerization include hydrocarbon-based solvents such as toluene, xylene, cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The weight-average molecular weight of the resin (B4) is preferably 10,000-500,000 and more preferably 50,000-300,000.

<Resin (B5)>

A resin (B5) used for the present invention refers to a resin copolymer (G) containing 5-20 mass % of a styrene constituent unit, 70-90 mass % of a (meth)acrylic ester constituent unit and 5-20 mass % of a N-substituted maleimide monomer, or an alloy resin of the resin copolymer (G) and the resin copolymer (D).

Examples of the N-substituted maleimide monomer of the resin copolymer (G) include N-aryl maleimides such as N-phenyl maleimide, N-chlorophenyl maleimide, N-methylphenyl maleimide, N-naphthyl maleimide, N-hydroxyphenyl maleimide, N-methoxyphenyl maleimide, N-carboxyphenyl maleimide, N-nitrophenyl maleimide and N-tribromophenyl maleimide, where N-phenyl maleimide is preferable in terms of miscibility with an acrylic resin. A mixture of two or more types of these N-substituted maleimide monomers may also be used.

Alternatively, the resin (B5) may be an alloy of the resin copolymer (G) and the resin copolymer (D).

While the styrene constituent unit is not particularly limited and any known styrene-based monomer can be used, it is styrene, α-methylstyrene, o-methylstyrene, m-methylstyrene, p-methylstyrene, t-butylstyrene or the like in terms of availability. Among them, styrene is particularly preferable in terms of miscibility. A mixture of two or more types of these styrene-based monomers may also be used.

Examples of the (meth)acrylic ester constituent unit include acrylic acid, methyl acrylate, ethyl acrylate, n-butyl acrylate, 2-ethylhexyl acrylate, methacrylic acid, methyl methacrylate, ethyl methacrylate, n-butyl methacrylate and 2-ethylhexyl methacrylate, where methyl methacrylate is particularly preferable as a monomer unit. Alternatively, it may be a copolymer containing two or more types of the above-described monomer units.

(Resin Laminate)

According to the present invention, a method for producing a resin laminate having a layer containing a high-hardness resin (B) on at least one surface of a resin layer (A) containing a polycarbonate resin (a1) is not particularly limited. While there are various methods, for example, a method in which the layer containing the high-hardness resin (B) and the resin layer (A) containing the polycarbonate resin (a1) that are individually formed are layered so as to bond both layers under heat and pressure, a method in which the layer containing the high-hardness resin (B) and the resin layer (A) containing the polycarbonate resin (a1) that are individually formed are layered and bonded using an adhesive, a method in which the layer containing the high-hardness resin (B) and the resin layer (A) containing the polycarbonate resin (a1) are coextruded, and a method in which the resin layer (A) containing the polycarbonate resin (a1) is integrated with the preformed layer containing the high-hardness resin (B) by in-mold forming, the coextrusion method is preferable in terms of production cost and productivity.

The coextrusion method is not particularly limited. For example, in a feedblock system, the layer containing the high-hardness resin (B) is laminated on one side of the resin layer (A) containing the polycarbonate resin (a1) using a feedblock, which is then extruded as a sheet using a t-die and subsequently cooled through a shaping roll to form a resin laminate desired. Alternatively, in a multimanifold system, the layer containing the high-hardness resin (B) is laminated on one side of the resin layer (A) containing the polycarbonate resin (a1) in a multimanifold die, which is then extruded as a sheet and subsequently cooled through a shaping roll to form a desired resin laminate.

Furthermore, the resin layer (A) containing the polycarbonate resin (a1) and the layer containing the high-hardness resin (B) of the present invention may be mixed with various additives as long as transparency is not impaired. Examples of the additive include an antioxidant, a coloring preventing agent, an antistatic agent, a mold release agent, a lubricant, a dye and a pigment. The mixing method is not particularly limited, and a method of compounding the whole, a method of dry blending the masterbatch, a method of dry blending the whole, or the like may be employed.

The thickness of the layer containing the high-hardness resin (B) affects the surface hardness and the shock resistance of the two-stage curable laminate. Specifically, if the layer is too thin, surface hardness is deteriorated, which is unfavorable. If the layer is too thick, shock resistance is deteriorated, which is unfavorable. The thickness of the layer containing the high-hardness resin (B) is 10-250 μm, preferably 30-200 μm and more preferably 60-150 μm.

According to the present invention, the total thickness of the resin layer (A) containing the polycarbonate resin (a1) and the layer containing the high-hardness resin (B) affects the warping after leaving the two-stage curable laminate under a high temperature and humidity environment. Specifically, if the total thickness is too thin, warping after leaving the two-stage curable laminate under a high temperature and humidity environment becomes large whereas if the total thickness is too thick, warping after leaving the two-stage curable laminate under a high temperature and humidity environment becomes small. Therefore, the total thickness of the resin layer (A) containing the polycarbonate resin (a1) and the layer containing the high-hardness resin (B) is 100-3,000 μm, preferably 120-2,500 μm and more preferably 150-2,000 μm.

Hereinafter, each of the components constituting the coating layer (Z) according to the present invention and methods of thermal polymerization/photopolymerization thereof will be described.

(Coating Layer (Z))

A coating layer of a two-stage curable laminate of the present invention contains 2-98 mass % of a (meth)acrylic-based monomer, 2-98 mass % of a (meth)acrylic-based oligomer and 0-15 mass % of a surface modifier, and further contains 0.001-2.5 parts by mass of a photopolymerization initiator and 0.001-5 parts by mass of a thermal polymerization initiator with respect to 100 parts by mass of the sum of the (meth)acrylic-based monomer, the (meth)acrylic-based oligomer and the surface modifier.

The coating layer preferably contains the (meth)acrylic-based monomer for 5-50 mass %, the (meth)acrylic-based oligomer for 50-95 mass % and the surface modifier for 1-10 mass %, and more preferably contains the (meth)acrylic-based monomer for 20-40 mass %, the (meth)acrylic-based oligomer for 60-80 mass % and the surface modifier for 2-5 mass %.

Moreover, the coating layer preferably contains the photopolymerization initiator for 0.01-2 parts by mass and the thermal polymerization initiator for 0.01-3 parts by mass, and more preferably contains the photopolymerization initiator for 0.1-1.5 parts by mass and the thermal polymerization initiator for 0.05-2 parts by mass with respect to 100 parts by mass of the sum of the (meth)acrylic-based monomer, the (meth)acrylic-based oligomer and the surface modifier.

The (meth)acrylic-based monomer may be a monofunctional monomer, a bifunctional monomer, a trifunctional or higher monomer as long as it has a (meth)acryloyl group as a functional group in the molecule.

Examples of the monofunctional monomer include (meth) acrylic acid and (meth)acrylic ester; specific examples of the bifunctional and/or the trifunctional or higher (meth)acrylate-based compound include diethylene glycol di(meth) acrylate, dipropylene glycol di(meth)acrylate, tripropylene glycol di(meth)acrylate, 1,6-hexanediol di(meth)acrylate, bisphenol A diglycidyl ether di(meth)acrylate, tetraethylene glycol di(meth)acrylate, neopentyl glycol hydroxypivalate diacrylate, neopentyl glycol di(meth)acrylate, 1,4-butanediol diacrylate, 1,3-butylene glycol di(meth)acrylate, dicyclopentanyl di(meth)acrylate, polyethylene glycol diacrylate, 1,4-butanediol oligoacrylate, neopentyl glycol oligoacrylate, 1,6-hexanediol oligoacrylate, trimethylolpropane tri(meth)acrylate, trimethylolpropane ethoxytri(meth) acrylate, trimethylolpropane propoxy tri(meth)acrylate, pentaerythritol tri(meth)acrylate, glycerylpropoxy tri(meth) acrylate, trimethylolpropane trimethacrylate, trimethylolpropane ethylene oxide adduct triacrylate, glycerin propylene oxide adduct triacrylate and pentaerythritol tetraacrylate.

Examples of the (meth)acrylic-based oligomer include a bifunctional or higher polyfunctional urethane (meth)acrylate oligomer [hereinafter, referred to as a polyfunctional urethane (meth)acrylate oligomer], a bifunctional or higher polyfunctional polyester (meth)acrylate oligomer [hereinafter, referred to as a polyfunctional polyester (meth)acrylate oligomer] and a bifunctional or higher polyfunctional epoxy (meth)acrylate oligomer [hereinafter, referred to as a polyfunctional epoxy (meth)acrylate oligomer]. One or more types of oligomers can be used.

An example of the polyfunctional urethane (meth)acrylate oligomer includes a product resulting from urethanization reaction between a (meth)acrylate monomer that has at least one (meth)acryloyloxy group and hydroxyl group in a single molecule and polyisocyanate. An examples of the polyfunctional urethane (meth)acrylate oligomer includes a product resulting from urethanization reaction between an isocyanate compound obtained by reacting a polyol with polyisocyanate and a (meth)acrylate monomer that has at least one (meth)acryloyloxy group and hydroxyl group in a single molecule.

Examples of the (meth)acrylate monomer that has at least one (meth)acryloyloxy group and hydroxyl group in a single molecule used for the urethanization reaction includes 2-hydroxyethyl (meth)acrylate, 2-hydroxypropyl (meth)acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri(meth)acrylate and dipentaerythritol penta(meth)acrylate.

Examples of polyisocyanate used for the urethanization reaction include hexamethylene diisocyanate, lysine diisocyanate, isophorone diisocyanate, dicyclohexyl methane diisocyanate, tolylene diisocyanate, xylylene diisocyanate, diisocyanates obtained by hydrogenating aromatic isocyanates among these diisocyanates (for example, diisocyanates such as hydrogenated tolylene diisocyanate and hydrogenated xylylene diisocyanate), polyisocyanates of di- or tri-isocyanates such as triphenylmethane triisocyanate and dimethylene triphenyl triisocyanate, and polyisocyanates obtained by multimerization of diisocyanates.

As the polyols used for the urethanization reaction, aromatic, aliphatic and alicyclic polyols, polyester polyol and polyether polyol are generally used. Examples of the aliphatic and alicyclic polyols generally include 1,4-butanediol, 1,6-hexanediol, neopentyl glycol, ethylene glycol, propylene glycol, trimethylolethane, trimethylolpropane, dimethylolheptane, dimethylolpropionic acid, dimethylolbutylic acid, glycerin and hydrogenated bisphenol A.

The polyester polyol can be obtained through dehydration condensation reaction between a polyol mentioned above and a polybasic carboxylic acid (anhydride). Exemplary compounds of the polybasic carboxylic acid specifically include succinic acid (anhydride), adipic acid, maleic acid (anhydride), trimellitic acid (anhydride), hexahydrophthalic acid (anhydride), phthalic acid (anhydride), isophthalic acid and terephthalic acid. In addition, examples of the polyether polyol include polyalkylene glycol, and a polyoxyalkylene modified polyol obtained through reaction between the above-mentioned polyol or phenol and alkylene oxide.

Moreover, the polyfunctional polyester (meth)acrylate oligomer can be obtained through dehydration condensation reaction between a (meth)acrylic acid, a polybasic carboxylic acid (anhydride) and a polyol. Examples of the polybasic carboxylic acid (anhydride) used for the dehydration condensation reaction include succinic acid (anhydride), adipic acid, maleic acid (anhydride), itaconic acid (anhydride), trimellitic acid (anhydride), pyromellitic acid (anhydride), hexahydrophthalic acid (anhydride), phthalic acid (anhydride), isophthalic acid and terephthalic acid. In addition, examples of the polyol used for the dehydration condensation reaction include 1,4-butanediol, 1,6-hexanediol, diethylene glycol, triethylene glycol, propylene glycol, neopentyl glycol, dimethylolheptane, dimethylolpropionic acid, dimethylolbutylic acid, trimethylolpropane, di-trimethylolpropane, pentaerythritol and dipentaerythritol.

The polyfunctional epoxy (meth)acrylate oligomer can be obtained through an addition reaction between a polyglycidyl ether and a (meth)acrylic acid. Examples of the polyglycidyl ether include ethylene glycol diglycidyl ether, propylene glycol diglycidyl ether, tripropylene glycol diglycidyl ether, 1,6-hexanediol diglycidyl ether, and bisphenol A diglycidyl ether.

<Surface Modifier>

A surface modifier used for the present invention refers to one that modifies the surface performance of the coating layer (Z), such as a leveling agent, an antistatic agent, a surfactant, a water and oil repellent, inorganic particles and organic particles.

Examples of the leveling agent include polyether-modified polyalkylsiloxane, polyether-modified siloxane, polyester-modified hydroxyl group-containing polyalkylsiloxane, polyether-modified polydimethylsiloxane having an alkyl group, modified polyether and silicon-modified acryl.

Examples of the antistatic agent include a glycerin fatty acid ester monoglyceride, a glycerin fatty acid ester organic acid monoglyceride, a polyglycerin fatty acid ester, a sorbitan fatty acid ester, a cationic surfactant and an anionic surfactant.

Examples of the inorganic particles include silica particles, alumina particles, zirconium particles, silicon particles, silver particles and glass particles.

Examples of the organic particles include acrylic particles and silicone particles. Examples of the surfactant and the water and oil repellent include fluorine-containing surfactants such as a fluorine group/lipophilic group-containing oligomer and a fluorine group/hydrophilic group/lipophilic group/UV reactive group-containing oligomer.

<Polymerization Initiator>

According to the present invention, both of heat bending property and high pencil hardness were achieved by providing a coating layer (Z) on a multilayer plate of a polycarbonate resin and a high-hardness resin. A photopolymerization initiator and a thermal polymerization initiator are used in combination as the polymerization initiators contained in the coating layer (Z) so as to realize two-stage curing that employs both light irradiation and heating steps in the polymerization reaction process. According to the present invention, the photopolymerization initiator refers to a light-induced radical generator while the thermal polymerization initiator refers to a heat-induced radical generator. Furthermore, photocuring is conducted as the first stage and then, as a heating step, a subject having the half-cured coating layer is heat bended, thereby allowing uniform curing. Specifically, light irradiation is performed while the laminate is in a flat shape so that uniform photocuring can be achieved on a plane, and then heat curing is performed during shaping or after the shaping so as to achieve uniform curing. If curing by light irradiation is performed after shaping, the shadow of the formed article may hinder uniform light irradiation/curing whereas the shadow of the formed article can be ignored in the case of heat curing.

<Photopolymerization Initiator>

Examples of the monofunctional photopolymerization initiator that can be used for the present invention include 4-(2-hydroxyethoxy)phenyl (2-hydroxy-2-propyl)ketone [Darocur 2959: from Merck]; α-hydroxy-α,α'-dimethyl acetophenone [Darocur 1173: from Merck]; acetophenone-based initiators such as methoxy acetophenone, 2,2'-dimethoxy-2-phenyl acetophenone [Irgacure-651] and 1-hydroxy-cyclohexyl phenylketone; benzoin ether-based initiator such as benzoin ethyl ether and benzoin isopropyl ether; as well as a halogenated ketone, acylphosphine oxide, acylphosphonate and the like.

Preferably, a metal halide lamp with a UV light (254 nm) radiation output of 20 mW/cm$^2$ is used so that the pencil hardness of the coating layer (Z) after the ultraviolet irradiation is F to 2H. A pencil hardness lower than F causes defects such as damage of the coating layer upon handling or heat bending, which result in poor yield. On the other hand, if the pencil hardness is higher than 2H, cracks are easily generated upon heat bending.

<Thermal Polymerization Initiator>

Examples of the thermal polymerization initiator that can be used for the present invention include azo compound-based initiators and organic peroxide-based initiators.

Examples of the azo compound-based initiators include 2,2'-azoisobutyronitrile 65° C. (temperature refers to the ten-hour half-life temperature; the same applies hereafter), 1,1'-azobis(cyclohexane-1-carbonitrile) 88° C., 2,2'-azobis{2-methylbutyronitrile} 67° C., 1-[(1-cyano-1-methylethyl)azo]formimide, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis[2-(hydroxymethyl)propionitrile], 2,2'-azobis(2,4-dimethylvaleronitrile) 51° C., 2,2'-azobis(4-methoxy-2,4-dimethylvaleronitrile) 30° C., 2,2'-azobis dimethyl isobutyrate 66° C., 2,2'-azobis[2-(2-imidazoline-2-yl)propane] 61° C., 2,2'-azobis-{2-methyl-N-[1,1-bis(hydroxymethyl)-2-hydroxyethyl]propionamide}, and 2,2'-azobis(N-butyl-2-methylpropionamide) 110° C. Among them, those having a ten-hour half-life temperature of 80° C.-130° C. are preferable, which are 1,1'-azobis(cyclohexane-1-carbonitrile), 2,2'-azobis(N-butyl-2-methylpropionamide) and 1-[(1-cyano-1-methylethyl)azo]formimide.

Examples of the organic peroxide-based initiator include benzoyl peroxide 74° C. (temperature refers to the ten-hour half-life temperature; the same applies hereafter), isobutyryl peroxide, cumyl peroxyoctoate 65° C., di-t-hexyl peroxide 116° C., di-t-butyl peroxide 124° C., 1,1,3,3-tetramethylbutyl hydroperoxide 153° C., and t-butylcumyl peroxide 120° C. Among them, those having a ten-hour half-life temperature of 80° C.-130° C. are preferable, which are di-t-hexyl peroxide 116° C. and t-butylcumyl peroxide 120° C.

The film thickness of the coating layer is preferably 1 μm to 40 μm, and more preferably 2 μm to 10 μm. If the film thickness is less than 1 μm, the pencil hardness after the curing becomes low whereas if the film thickness exceeds 40 μm, cracks are easily generated upon bending. Here, the film thickness of the coating layer can be measured by observing the cross section with a microscope or the like and actually measuring from the interface to the surface of the coating film.

In order to enhance the adhesion of the coating layer, the surface to be coated may be subjected to a pretreatment. Examples of such a treatment include known techniques such as sand blasting, a solvent treatment, a corona discharge treatment, a chromic acid treatment, a flame treatment, a hot air treatment, an ozone treatment, an ultraviolet treatment and a primer treatment with a resin composition.

The method for applying the coating layer (polymerizable composition) according to the present invention is not particularly limited and a known method can be employed. Examples include a spin coating method, a dip method, a spray method, a slide coating method, a bar coating method, a roll coating method, a gravure coating method, a meniscus coating method, a flexographic printing method, a screen-printing method, a bead coating method and a brush coating method.

Next, a method for producing a formed article having a curved shape by using the two-stage curable laminate of the present invention will be described. the two-stage curable laminate of the present invention allows uniform curing by performing photocuring as the first stage, and subjecting the laminate having the half-cured coating layer to heat bending so that the heat bending step also serves as a heating step. Although heat curing may be performed as the first stage and photocuring may be performed after bending, it is unfavorable since photocuring after bending is difficult to give uniform light irradiation and likely to cause uneven curing. Hereinafter, respective steps will be described.

(Photopolymerization)

A lamp used for light irradiation is one whose light emission distribution includes optical wavelengths of 420 nm or less, examples being a low-pressure mercury lamp, a medium-pressure mercury lamp, a high-pressure mercury lamp, an ultra-high-pressure mercury lamp, a chemical lamp, a black light lamp, a microwave powered mercury lamp and a metal halide lamp. Among them, a high-pressure mercury lamp or a metal halide lamp is preferable since they efficiently emit light in the active wavelength region of the initiator but not much of short-wavelength light that deteriorates viscoelastic property of the resulting polymer by crosslinking or long-wavelength light that heats and evaporates the reaction composition.

The irradiation intensity of the above-described lamp to the reactive composition is a factor that influences the polymerization degree of the resulting polymer, which can appropriately be regulated according to performance of the article of interest. If a usual cleavage-type initiator having an acetophenone group is blended, illuminance is preferably in a range of 0.1-300 mW/cm$^2$. Particularly preferably, a metal halide lamp is used to give illuminance of 20 mW/cm$^2$.

The photopolymerization according to the present invention is inhibited with oxygen in the air or oxygen contained in the reactive composition. Accordingly, light irradiation needs to be conducted by a technique that can eliminate reaction inhibition by oxygen. As one of such techniques, there is a method in which the reactive composition is covered with a polyethylene terephthalate or Teflon film so as to block contact with oxygen, while the composition is irradiated with light via this film. Alternatively, the composition may be irradiated with light via a light transmitting window in an atmosphere where oxygen has been replaced with inert gas such as nitrogen gas or carbon dioxide gas.

If light irradiation is conducted in an inert zone, a certain amount of inert gas is constantly introduced into this zone to keep the oxygen concentration of the atmosphere to a low level. Due to this introduced gas, air flow is generated on the surface of the reactive composition, which causes evaporation of the monomers. In order to achieve air flow velocity required to suppress this evaporation level to be low, the relative velocity with respect to the composition transferring along with the substrate in this zone is preferably 1 m/sec or lower and more preferably 0.1 m/sec or lower. Evaporation due to the air flow can substantially be prevented if the air flow velocity can be kept to about 0.1 m/sec.

(Heat Curing)

Heat curing according to the present invention refers to heat polymerization (thermal polymerization) of the unreacted acryloyl group contained in the coating layer (Z) of the two-stage curable laminate of the present invention. The acryloyl group that remained unreacted by the photopolymerization is polymerized with the heat radical polymerization initiator.

Heat may be applied to the two-stage curable laminate upon heating in the thermoforming process, or by an additional heat treatment.

If the thermoforming process is, for example, heat press forming, it is preferably conducted at a temperature of 100° C.-130° C. for forming time of 3-20 minutes depending on the thickness of the plate.

In a case of pressure forming or vacuum forming, the plate is preferably heated at 170° C.-190° C. and then formed in 10 seconds to 3 minutes.

In addition, the heat treatment following the thermoforming process is preferably conducted at 90° C.-110° C. for 30 minutes to 3 hours.

EXAMPLES

Example 1

<Method for Preparing Two-Stage Curable Laminate Having Resin Laminate (Y1)>

A multilayer extrusion machine provided with a 35-mm-diameter single screw extruder, a 65-mm-diameter single screw extruder, a feedblock connected to all extruders and a t-die connected to the feedblock was used to form a resin laminate. Specifically, a (meth)acrylic ester constituent unit represented by Formula (1) wherein both $R_1$ and $R_2$ were methyl groups, and an aliphatic vinyl constituent unit represented by Formula (2) wherein $R_3$ was a hydrogen atom and $R_4$ was a cyclohexyl group (the (meth)acrylic ester constituent unit for 75 mol % and the aliphatic vinyl constituent unit for 25 mol %, with a weight-average molecular weight of 120,000) were used as a high-hardness resin (B1) in the 35-mm-diameter single screw extruder.

The resin (B1) was continuously introduced and extruded under the conditions of a cylinder temperature of 240° C. and a discharge speed of 2.6 kg/h. Meanwhile, a polycarbonate resin (from Mitsubishi Engineering-Plastics Corporation, under the trade name of Iupilon S-1000) was continuously introduced into the 65-mm-diameter single screw extruder and extruded at a cylinder temperature of 280° C. and a discharge speed of 50.0 kg/h. The feedblock connected to all extruders was provided with 2-type 2-layer distribution pins, into which the high-hardness resin and the polycarbonate resin were introduced and laminated at a temperature of 270° C. The resultant was extruded as a sheet with the t-die connected ahead at a temperature of 270° C., and cooled while being transferred with a mirror surface thereon using three mirror-finishing rolls at temperatures of 120° C., 130° C. and 190° C. respectively from the upstream side, thereby obtaining a resin laminate (Y1) of a layer containing the high-hardness resin and a layer containing the polycarbonate resin. The thickness of the resulting resin laminate (Y1) was 1.2 mm, while the thickness of the layer containing the high-hardness resin (B1) was 60 μm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries [compound name: 2,2'-azobis(N-butyl-2-methylpropionamide)], ten-hour half-life temperature 110° C.), with 100 parts by mass of a following mixture:

U6HA: 60 mass % of a hexafunctional urethane acrylate oligomer (from Shin-Nakamura Chemical)

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the resin laminate (Y1) obtained above with a bar coater, and cured under a metal halide lamp (20 mW/cm$^2$) for 5 seconds to prepare a photopolymerized two-stage curable laminate. The film thickness of the coating layer (Z) was 8 μm. The following evaluations were conducted for the resulting photopolymerized two-stage curable laminate, where the results are shown in Table 1.

<Evaluation of Rainbow Effect Defect Phenomenon>

The intensity of the interference fringe of the above-described photopolymerized two-stage curable laminate was evaluated using an interference fringe inspection lamp (FNA-35) from Funatech. ○ represents that no interference fringe was visually observed whereas × represents that interference fringe was visually observed.

<Evaluation of Cracks After Forming>

Presence or absence of cracks was visually confirmed after forming the above-described photopolymerized two-stage curable laminate with a hot press mold having a top surface with a radius of 10 mm, a corner with a radius of 10 mm and a height of 4 mm.

<Evaluation of Storage Stability>

The above-described photopolymerized two-stage curable laminate was left in a drier at 50° C. for 300 hours, and then thermoformed in a hot press machine using a mold having a top surface with a radius of 10 mm, a corner with a radius of 10 mm and a height of 4 mm so as to confirm whether or not the thermally polymerized two-stage curable laminate has a crack. ○ represents that no crack was generated whereas × represents that a crack was generated. The temperature for hot press forming was 125° C. while the press time was 3 minutes.

<Pencil Hardness Before and After Heat Treatment (Thermal Polymerization)>

The above-described photopolymerized two-stage curable laminate was evaluated by a pencil scratch hardness test according to JIS K 5600-5-4 before and after the heat treatment (only heat press forming was performed in Examples 3 and 4 and Comparative examples 3 and 4, while an annealing heat treatment was performed in addition to heat press forming in Examples 1, 2 and 5-11 and Comparative examples 1, 2 and 5). Pencil hardness was determined as the hardest pencil hardness as which no scratch was left on the surface of the coating layer (Z) when a pencil was pressed on the surface at an angle of 45° with a load of 750 g while stepwisely increasing the hardness of the pencil. A hardness of 3H or higher after the heat treatment was evaluated to be acceptable. The hot press forming temperature was 125° C. while the press time was 3 minutes. The annealing treatment was performed on the heat press formed two-stage curing laminate in an oven at 110° C. for an hour.

Example 2

A resin laminate (Y1) was prepared in the same manner as Example 1.

A material for forming a coating layer (Z) was prepared by adding and stirring:

photopolymerization initiator: 2 parts by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 μm.

The same evaluations as Example 1 were conducted, where the results are shown in Table 1.

Example 3

A resin laminate (Y1) was prepared in the same manner as Example 1.

A material for forming a coating layer (Z) was prepared by adding and stirring:

photopolymerization initiator: 0.5 parts by mass of 1-184 (from BASF [compound name: 1-hydroxy-cyclohexyl phenylketone]), and thermal polymerization initiator: 2 parts by mass of 1,1'-azobis(cyclohexane-1-carbonitrile) (from Wako Pure Chemical Industries, ten-hour half-life temperature 88° C.)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) in a nitrogen atmosphere for 5 seconds to prepare a two-stage curable laminate. The film thickness of the coating layer (Z) was 8 μm.

The same evaluations as Example 1 were conducted, where the results are shown in Table 1.

Example 4

A resin laminate (Y1) was prepared in the same manner as Example 1.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 parts by mass of 1,1'-azobis(cyclohexane-1-carbonitrile) (from Wako Pure Chemical Industries, ten-hour half-life temperature 88° C.)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 μm.

The same evaluations as Example 1 were conducted, where the results are shown in Table 1.

Example 5

A resin laminate (Y1) was prepared in the same manner as Example 1.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 parts by mass of t-butylcumyl peroxide (from NOF Corporation), ten-hour half-life temperature 120° C.)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 µm.

The same evaluations as Example 1 were conducted, where the results are shown in Table 1.

Example 6

<Method for Preparing Two-Stage Curable Laminate Having Resin Laminate (Y1-2)>

A resin laminate (Y1-2) of a layer containing a high-hardness resin (B1) and a layer containing a polycarbonate resin was obtained in the same manner as Example 1 except that the discharge speed of the high-hardness resin (B1) used in Example 1 was changed to 4.8 kg/h and the discharge speed of the polycarbonate resin (from Mitsubishi Engineering-Plastics Corporation, under the trade name of Iupilon S-1000) was 35 kg/h.

The thickness of the resulting resin laminate (Y1-2) was 0.5 mm, while the thickness of the layer containing the high-hardness resin (B1) was 60 µm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1-2) with a bar coater, and cured under a metal halide lamp (20 mW/cm$^2$) for 5 seconds to prepare a two-stage curable laminate. The film thickness of the coating layer (Z) was 8 µm.

The same evaluations as Example 1 were conducted, where the results are shown in Table 1.

Example 7

<Method for Preparing Two-Stage Curable Laminate Having Resin Laminate (Y2)>

A resin laminate was formed by using a multilayer extrusion machine provided with a 35-mm-diameter single screw extruder, a 65-mm-diameter single screw extruder, a feedblock connected to all extruders and a t-die connected to the feedblock. Specifically, a resin composed of a copolymer of 77 mass % of methyl methacrylate, 15 mass % of styrene and 8 mass % of maleic anhydride (PLEXIGLAS hw55 from Daicel-Evonik) as a high-hardness resin (B2) was continuously introduced into the 35-mm-diameter single screw extruder, and extruded under conditions of a cylinder temperature of 230° C. and a discharge speed of 2.6 kg/h. Meanwhile, a polycarbonate resin (from Mitsubishi Engineering-Plastics Corporation, under the trade name of Iupilon S-1000) was continuously introduced into the 65-mm-diameter single screw extruder and extruded at a cylinder temperature of 280° C. and a discharge speed of 50.0 kg/h. The feedblock connected to all extruders was provided with 2-type 2-layer distribution pins into which the high-hardness resin and the polycarbonate resin were introduced to be laminated at a temperature of 270° C. The resultant was extruded as a sheet with the t-die connected ahead at a temperature of 270° C., and cooled while being transferred with a mirror surface thereon using three mirror-finishing rolls at temperatures of 120° C., 130° C. and 190° C. respectively from the upstream side, thereby obtaining a resin laminate (Y2) of a layer containing the high-hardness resin and a layer containing the polycarbonate resin. The thickness of the resulting resin laminate (Y2) was 1.2 mm, while the thickness of the layer containing the high-hardness resin (B2) was 60 µm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y2) with a bar coater, and cured under a metal halide lamp (20 mW/cm$^2$) for 5 seconds to prepare a two-stage curable laminate. The film thickness of the coating layer (Z) was 8 µm.

The same evaluations as Example 1 were conducted, where the results are shown in Table 1.

Example 8

<Method for Preparing Two-Stage Curable Laminate Having Resin Laminate (Y3)>

58.95 mass % of a polycarbonate resin (from Mitsubishi Engineering-Plastics Corporation, under the trade name of Iupilon E-2000, weight-average molecular weight=28,000) (E), 40 mass % of a (meth)acrylate copolymer (from Mitsubishi Rayon, under the trade name of Metablen H-880, weight-average molecular weight=14,000, mass ratio (f1/f2) of aromatic (meth)acrylate unit (f1) and methacrylic ester monomer unit (f2)=34/66) (F), 0.2 mass % of Rikemal H-100 (Riken Vitamin), 0.1 mass % of Irganox 1010 (from BASF), 0.05 mass % of PEP36 (from ADEKA) and 0.7 mass % of Tinuvin1600 (from BASF) were melt kneaded with an extruder with a screw diameter of 26 mm (from Toshiba Machine, TEM-26SS, L/D≈40) at 240° C. to give a high-hardness resin (B3).

A resin laminate was formed by using a multilayer extrusion machine provided with a 35-mm-diameter single screw extruder, a 65-mm-diameter single screw extruder, a feedblock connected to all extruders and a t-die connected to the feedblock. Specifically, the high-hardness resin (B3) was continuously introduced into the 35-mm-diameter single screw extruder, and extruded under conditions of a cylinder temperature of 230° C. and a discharge speed of 2.6 kg/h. Meanwhile, a polycarbonate resin (from Mitsubishi Engineering-Plastics Corporation, under the trade name of Iupilon S-1000) was continuously introduced into the 65-mm-diameter single screw extruder and extruded at a cylinder temperature of 280° C. and a discharge speed of 50.0 kg/h. The feedblock connected to all extruders was provided with 2-type 2-layer distribution pins into which the high-hardness resin and the polycarbonate resin were introduced to be laminated at a temperature of 270° C. The resultant was extruded as a sheet with the t-die connected ahead at a temperature of 270° C., and cooled while being transferred with a mirror surface thereon using three mirror-finishing rolls at temperatures of 120° C., 130° C. and 190° C. respectively from the upstream side, thereby obtaining a resin laminate (Y3) of a layer containing the high-hardness resin and a layer containing the polycarbonate resin. The thickness of the resulting resin laminate (Y3) was 1.2 mm, while the thickness of the layer containing the high-hardness resin (B3) was 60 µm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y3) with a bar coater, and cured under a metal halide lamp (20 mW/cm$^2$) for 5 seconds to prepare a two-stage curable laminate. The film thickness of the coating layer (Z) was, 8 µm.

The same evaluations as Example 1 were conducted, where the results are shown in Table 1.

Example 9

<Method for Preparing Two-Stage Curable Laminate Having Resin Laminate (Y4)>

A resin laminate was formed by using a multilayer extrusion machine provided with a 32-mm-diameter single screw extruder, a 65-mm-diameter single screw extruder, a feedblock connected to all extruders and a t-die connected to the feedblock. Specifically, an acrylic resin (from Kuraray, under the trade name of Parapet HR-1000L, $R_1$ in Formula (1) is a hydrogen atom or a methyl group, and $R_2$ is a methyl group) as a high-hardness resin (B4) was continuously introduced into the 32-mm-diameter single screw extruder, and extruded under conditions of a cylinder temperature of 250° C. and a discharge speed of 2.6 kg/h. Meanwhile, a polycarbonate resin (from Mitsubishi Engineering-Plastics Corporation, under the trade name of Iupilon S-1000) was continuously introduced into the 65-mm-diameter single screw extruder, and extruded at a cylinder temperature of 270° C. and a discharge speed of 32.0 kg/h. The feedblock connected to all extruders was provided with 2-type 2-layer distribution pins into which the high-hardness resin and the polycarbonate resin were introduced to be laminated at a temperature of 270° C. The resultant was extruded as a sheet with the t-die connected ahead at a temperature of 270° C., and cooled while being transferred with a mirror surface thereon using three mirror-finishing rolls at temperatures of 110° C., 140° C. and 185° C. respectively from the upstream side, thereby obtaining a resin laminate (Y4) of a layer containing the high-hardness resin and a layer containing the polycarbonate resin. The thickness of the resulting resin laminate (Y4) was 0.8 mm, while the thickness of the layer containing the high-hardness resin (B4) was 60 µm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y4) with a bar coater, and cured under a metal halide lamp (20 mW/cm$^2$) for 5 seconds to prepare a two-stage curable laminate. The film thickness of the coating layer (Z) was 8 µm.

The same evaluations as Example 1 were conducted, where the results are shown in Table 1.

Example 10

<Method for Preparing Two-Stage Curable Laminate Having Resin Laminate (Y4-2)>

A resin laminate was formed by using a multilayer extrusion machine provided with a 50-mm-diameter single screw extruder, a 100-mm-diameter single screw extruder, a feedblock connected to all extruders and a t-die connected to the feedblock. Specifically, an acrylic resin (from Kuraray, under the trade name of Parapet HR-1000L) as a high-hardness resin (B4) was continuously introduced into the 50-mm-diameter single screw extruder, and extruded under conditions of a cylinder temperature of 250° C. and a discharge speed of 57 kg/h. Meanwhile, a polycarbonate resin (from Mitsubishi Engineering-Plastics Corporation, under the trade name of Iupilon S-1000) was continuously introduced into the 100-mm-diameter single screw extruder, and extruded at a cylinder temperature of 280° C. and a discharge speed of 147 kg/h. The feedblock connected to all extruders was provided with 2-type 2-layer distribution pins into which the high-hardness resin and the polycarbonate resin were introduced to be laminated at a temperature of 320° C. The resultant was extruded as a sheet with the t-die connected ahead at a temperature of 320° C., and cooled while being transferred with a mirror surface thereon using three mirror-finishing rolls at temperatures of 125° C., 95° C. and 1110° C. respectively from the upstream side, thereby obtaining a resin laminate (Y4-2) of a layer containing the high-hardness resin and a layer containing the polycarbonate resin. The thickness of the resulting resin laminate (Y4-2) was 0.125 mm, while the thickness of the layer containing the high-hardness resin (B4) was 40 μm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

30 parts by mass of the resulting coating-layer-forming material was dissolved in 70 parts by mass of a solvent, methyl ethyl ketone. The resultant was applied to the obtained resin laminate (Y4-2) with a bar coater, and placed in a drier set at 80° C. for a minute to dry the solvent. Thereafter, the resultant was cured under a metal halide lamp (20 mW/cm$^2$) in a nitrogen atmosphere for 5 seconds to prepare a two-stage curable laminate. The film thickness of the coating layer (Z) was 4 μm.

The same evaluations as Example 1 were conducted, where the results are shown in Table 1.

Example 11

<Method for Preparing Two-Stage Curable Laminate Having Resin Laminate (Y5)>

A resin laminate was formed by using a multilayer extrusion machine provided with a 35-mm-diameter single screw extruder, a 65-mm-diameter single screw extruder, a feedblock connected to all extruders and a t-die connected to the feedblock. Specifically, a resin composed of a copolymer of 7 mass % of styrene, 86 mass % of methyl methacrylate, and 7 mass % of N-phenyl maleimide (Asahi Kasei Chemicals, under the trade name of Delpet PM120N) as a high-hardness resin (B5) was continuously introduced into the 35-mm-diameter single screw extruder, and extruded under conditions of a cylinder temperature of 230° C. and a discharge speed of 2.6 kg/h. Meanwhile, a polycarbonate resin (from Mitsubishi Engineering-Plastics Corporation, under the trade name of Iupilon S-1000) was continuously introduced into the 65-mm-diameter single screw extruder, and extruded at a cylinder temperature of 280° C. and a discharge speed of 62.0 kg/h. The feedblock connected to all extruders was provided with 2-type 2-layer distribution pins into which the high-hardness resin and the polycarbonate resin were introduced to be laminated at a temperature of 270° C. The resultant was extruded as a sheet with the t-die connected ahead at a temperature of 270° C., and cooled while being transferred with a mirror surface thereon using three mirror-finishing rolls at temperatures of 120° C., 130° C. and 190° C. respectively from the upstream side, thereby obtaining a resin laminate (Y5) of a layer containing the high-hardness resin and a layer containing the polycarbonate resin. The thickness of the resulting resin laminate (Y5) was 1.5 mm, while the thickness of the layer containing the high-hardness resin (B5) was 60 μm near the center.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

CN968: 55 mass % of hexafunctional acrylate oligomer (from Sartomer), 15 mass % of tricyclodecane dimethanol diacrylate (from Kyoeisha Chemical), 25 mass % of polyethylene glycol diacrylate (from Shin-Nakamura Chemical), and RS-90: 5 mass % of a fluorine-containing group/hydrophilic group/lipophilic group/UV reactive group-containing oligomer (from DIC).

The resulting coating-layer-forming material was applied to the obtained resin laminate (Y5) with a bar coater, and cured under a metal halide lamp (20 mW/cm$^2$) for 5 seconds to prepare a two-stage curable laminate. The film thickness of the coating layer (Z) was 6 μm.

The same evaluations as Example 1 were conducted, where the results are shown in Table 1.

Comparative Example 1

<Method for Preparing Monolayer Resin Plate>

A resin plate was formed by using an extrusion machine provided with a t-die connected to a 65-mm-diameter single screw extruder. Specifically, a polycarbonate resin (from Mitsubishi Engineering-Plastics Corporation, under the trade name of Iupilon S-1000) was continuously introduced into the above-described extruder, and extruded at a cylinder temperature of 270° C. and a discharge speed of 32.0 kg/h. The resultant was extruded as a sheet with the t-die at a temperature of 270° C. connected to the extruder, and cooled while being transferred with a mirror surface thereon using three mirror-finishing rolls at temperatures of 110° C., 140° C. and 185° C. respectively from the upstream side, thereby obtaining a polycarbonate resin monolayer. The thickness of the resulting laminate was 0.8 mm.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained monolayer with a bar coater, and cured under a metal halide lamp (20 mW/cm$^2$) for 5 seconds to prepare a two-stage curable plate. The film thickness of the coating layer (Z) was 8 μm.

The same evaluations as Example 1 were conducted, where the results are shown in Table 1.

Comparative Example 2

<Monolayer Resin Film>

A polyester film with a thickness of 0.1 mm (from Toyobo, under the trade name of Cosmoshine PET A4300) was used.

A material for forming a coating layer (Z) was prepared by adding and stirring:

photopolymerization initiator: 1 part by mass of 1-184 (from BASF [compound name: 1-hydroxy-cyclohexyl phenylketone]), and thermal polymerization initiator: 2 part by mass of VAm-110 (from Wako Pure Chemical Industries)

with 100 parts by mass of a following mixture:

U6HA: 60 mass % of a hexafunctional urethane acrylate oligomer (from Shin-Nakamura Chemical),

260: 35 mass % of 1,9-nonanediol diacrylate (from Osaka Organic Chemical Industry), and 5 mass % of a fluorine-based leveling agent.

30 parts by mass of the resulting coating-layer-forming material was dissolved in 70 parts by mass of a solvent, methyl ethyl ketone, and applied to the above-described polyester film with a bar coater. The resultant was placed in a drier set at 80° C. for a minute to dry the solvent. Thereafter, the resultant was cured under a metal halide lamp (20 mW/cm$^2$) in a nitrogen atmosphere for 5 seconds to prepare a two-stage curable laminate. The film thickness of the coating layer (Z) was 4 μm.

The same evaluations as Example 1 were conducted, where the results are shown in Table 1.

Comparative Example 3

A resin laminate (Y1) was prepared in the same manner as Example 1.

A material for forming a coating layer (Z) was prepared by adding and stirring:

photopolymerization initiator: 1 part by mass of 1-184 (from BASF) [compound name: 1-hydroxy-cyclohexyl phenylketone]), and thermal polymerization initiator: 2 parts by mass of 2,2'-azoisobutyronitrile (from Wako Pure Chemical Industries, ten-hour half-life temperature 65° C.)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 μm.

The same evaluations as Example 1 were conducted, where the results are shown in Table 1.

Comparative Example 4

A resin laminate (Y1) was prepared in the same manner as Example 1.

A material for forming a coating layer (Z) was prepared by adding and stirring:

photopolymerization initiator: 1 part by mass of 1-184 (from BASF) [compound name: 1-hydroxy-cyclohexyl phenylketone]), and thermal polymerization initiator: 2 parts by mass of benzoyl peroxide (from NOF Corporation), ten-hour half-life temperature 74° C.)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 μm.

The same evaluations as Example 1 were conducted, where the results are shown in Table 1.

Comparative Example 5

A resin laminate (Y1) was prepared in the same manner as Example 1.

A material for forming a coating layer (Z) was prepared by adding and stirring:

photopolymerization initiator: 1 part by mass of 1-184 (from BASF) [compound name: 1-hydroxy-cyclohexyl phenylketone]), and thermal polymerization initiator: 2 parts by mass of butyl hydroperoxide (from NOF Corporation), ten-hour half-life temperature 153° C.)

with 100 parts by mass of a following mixture:

U6HA: 60 mass % of a functional urethane acrylate oligomer (from Shin-Nakamura Chemical),

260: 35 mass % of 1,9-nonanediol diacrylate (from Osaka Organic Chemical Industry), and RS-90: 5 mass % of a fluorine-containing group/hydrophilic group/lipophilic group/UV reactive group-containing oligomer (from DIC).

The resulting coating-layer-forming material was applied to the obtained resin laminate (Y1) with a bar coater, and cured under a metal halide lamp (20 mW/cm$^2$) for 5 seconds to prepare a two-stage curable laminate. The film thickness of the coating layer (Z) was 8 μm.

The same evaluations as Example 1 were conducted, where the results are shown in Table 1.

TABLE 1

| | Rainbow effect defect | Cracks after shaping | Storage stability | Pencil hardness before heat treatment (thermal polymerization) | Pencil hardness after heat treatment (thermal polymerization) |
|---|---|---|---|---|---|
| Example 1 | ◯ | Absent | ◯ | H | 4H |
| Example 2 | ◯ | Absent | ◯ | 2H | 4H |

TABLE 1-continued

|  | Rainbow effect defect | Cracks after shaping | Storage stability | Pencil hardness before heat treatment (thermal polymerization) | Pencil hardness after heat treatment (thermal polymerization) |
|---|---|---|---|---|---|
| Example 3 | ○ | Absent | ○ | F | 4H |
| Example 4 | ○ | Absent | ○ | H | 4H |
| Example 5 | ○ | Absent | ○ | H | 4H |
| Example 6 | ○ | Absent | ○ | H | 4H |
| Example 7 | ○ | Absent | ○ | H | 4H |
| Example 8 | ○ | Absent | ○ | H | 4H |
| Example 9 | ○ | Absent | ○ | H | 4H |
| Example 10 | ○ | Absent | ○ | H | 4H |
| Example 11 | ○ | Absent | ○ | H | 4H |
| Comparative example 1 | x | Absent | ○ | F | 2H |
| Comparative example 2 | x | Absent | ○ | F | 2H |
| Comparative example 3 | ○ | Present | x | H | 4H |
| Comparative example 4 | ○ | Present | x | H | 4H |
| Comparative example 5 | ○ | Absent | ○ | H | 2H |

The invention claimed is:

1. A two-stage curable laminate comprising a layer containing a high-hardness resin (B) on at least one surface of a resin layer (A) containing a polycarbonate resin (a1), the two-stage curable laminate further comprising a coating layer (Z) on the layer containing the high-hardness resin (B), and satisfying the following conditions (i) to (iii):

(i) a thickness of the layer containing the high-hardness resin (B) is 10-250 μm, while a total thickness of the resin layer (A) containing the polycarbonate resin (a1) and the layer containing the high-hardness resin (B) is 100-3,000 μm;

(ii) the high-hardness resin (B) comprises at least one of resins (B1) to (B5) below resin (B1):

a copolymer resin comprising a (meth)acrylic ester constituent unit (a) represented by Formula (1) below and an aliphatic vinyl constituent unit (b) represented by Formula (2) below, wherein a total ratio of the (meth)acrylic ester constituent unit (a) and the aliphatic vinyl constituent unit (b) is 90-100 mol % to the entire constituent units of the copolymer resin, and a ratio of the (meth)acrylic ester constituent unit (a) is 65-80 mol % to the entire constituent units of the copolymer resin

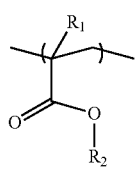

(1)

wherein $R_1$ is a hydrogen atom or a methyl group, and $R_2$ is a C1-C18 alkyl group, (2)

wherein $R_3$ is a hydrogen atom or a methyl group, $R_4$ is a cyclohexyl group optionally having a C1-C4 hydrocarbon group, resin (B2):

a resin copolymer (D) comprising 6-77 mass % of a (meth)acrylic ester constituent unit, 15-71 mass % of a styrene constituent unit and 8-23 mass % of an unsaturated dicarboxylic acid constituent unit, or an alloy resin of the resin copolymers (D), resin (B3):

a resin comprising 95-45 mass % of a polycarbonate resin (E) and 5-55 mass % of a (meth)acrylate copolymer (F), wherein the (meth)acrylate copolymer (F) contains an aromatic (meth)acrylate unit (f1) and a methacrylic ester monomer unit (f2) at a mass ratio (f1/f2) of 10-50/40-90, a weight-average molecular weight of the polycarbonate resin (E) is 28,000-71,000, and a weight-average molecular weight of the (meth)acrylate copolymer (F) is 5,000-30,000, resin (B4):

a (meth)acrylic ester resin in which a ratio of a constituent unit represented by Formula (1) below to the entire constituent units is 91 mass % or more (1)

wherein $R_1$ is a hydrogen atom or a methyl group, and $R_2$ is a C1-C18 alkyl group, and resin (B5):

a resin copolymer (G) containing 5-20 mass % of a styrene constituent unit, 70-90 mass % of a (meth)acrylic ester constituent unit and 5-20 mass % of a N-substituted maleimide monomer, or an alloy resin of the resin copolymer (G) and the resin copolymer (D); and (iii) the coating layer (Z) comprises 2-98 mass % of a (meth)acrylic-based monomer, 2-98 mass % of a (meth)acrylic-based oligomer and 0-15 mass % of a surface modifier, and further comprises 0.001-2.5 parts by mass of a photopolymerization initiator and 0.001-5 parts by mass of a thermal polymerization initiator with respect to 100 parts by mass of the sum of the (meth)acrylic-based monomer, the (meth)acrylic-based oligomer and the surface modifier, wherein the ten-hour half-life temperature of the thermal polymerization initiator is 88° C.-120° C., and wherein the thermal polymerization initiator comprises at least one initiator selected from the group consisting of azo compound-based initiators and organic peroxide-based initiators.

2. The two-stage curable laminate according to claim 1, wherein the coating layer (Z) is photopolymerized.

3. The two-stage curable laminate according to claim 2, which is further thermally polymerized.

4. The two-stage curable laminate according to claim 3, wherein a pencil hardness of the coating layer (Z) after the thermal polymerization is 3H or higher.

5. The two-stage curable laminate according to claim 3, wherein the coating layer (Z) is thermally polymerized and heat bent at the same time.

6. The two-stage curable laminate according to claim 2, wherein a pencil hardness of the coating layer (Z) after the photopolymerization is F to 2H.

7. The two-stage curable laminate according to claim 1, wherein a film thickness of the coating layer (Z) is 1 μm to 40 μm.

8. A touchscreen protective front panel comprising the two-stage curable laminate according to claim 1.

9. A front panel for an office automation equipment or a portable electronic device, comprising the two-stage curable laminate according to claim 1.

10. A back panel for an office automation equipment or a portable electronic device, comprising the two-stage curable laminate according to claim 1.

11. An automobile part using the two-stage curable laminate according to claim 1.

12. An automobile interior member using the two-stage curable laminate according to claim 1.

* * * * *